(12) United States Patent
Chan et al.

(10) Patent No.: US 8,774,716 B2
(45) Date of Patent: Jul. 8, 2014

(54) MOBILE TERMINAL EXTENSION CASE

(75) Inventors: Ching-Chih Chan, Taichung (TW);
Jhe-Min Lin, Taoyuan County (TW);
Ching-Wei Chang, New Taipei (TW);
Yen-Chao Li, Taoyuan County (TW)

(73) Assignee: Auden Techno Corp., Taoyuan County (TW)

( * ) Notice: Subject to any disclaimer, the term of this patent is extended or adjusted under 35 U.S.C. 154(b) by 281 days.

(21) Appl. No.: 13/433,389

(22) Filed: Mar. 29, 2012

(65) Prior Publication Data

US 2013/0260675 A1 Oct. 3, 2013

(51) Int. Cl.
*H04W 88/02* (2009.01)

(52) U.S. Cl.
USPC .......................................... 455/41.1; 235/492

(58) Field of Classification Search
CPC ................... G06K 19/0723; G06K 19/07749
USPC .......................................... 455/41.1; 235/492
See application file for complete search history.

(56) References Cited

U.S. PATENT DOCUMENTS

| | | | | |
|---|---|---|---|---|
| 5,634,209 | A * | 5/1997 | Prudhomme et al. | 455/345 |
| 5,649,316 | A * | 7/1997 | Prudhomme et al. | 455/345 |
| 5,670,769 | A * | 9/1997 | Pernet | 235/441 |
| 6,049,813 | A * | 4/2000 | Danielson et al. | 708/100 |
| 6,194,998 | B1 * | 2/2001 | Huang | 340/442 |
| 6,769,621 | B2 * | 8/2004 | Hautier et al. | 235/492 |
| 6,910,634 | B1 * | 6/2005 | Inose et al. | 235/486 |
| 6,917,176 | B2 * | 7/2005 | Schempf et al. | 318/568.11 |
| 7,055,751 | B2 * | 6/2006 | Lin | 235/487 |
| 7,239,238 | B2 * | 7/2007 | Tester et al. | 340/539.31 |
| 7,541,930 | B2 * | 6/2009 | Saarisalo et al. | 340/572.7 |
| 7,712,669 | B2 * | 5/2010 | Mahany et al. | 235/472.02 |
| 7,912,520 | B2 * | 3/2011 | Choi et al. | 455/575.1 |
| 7,964,808 | B2 * | 6/2011 | Seo et al. | 200/5 R |
| 7,974,588 | B2 * | 7/2011 | Akieda | 455/90.3 |
| 8,046,036 | B2 * | 10/2011 | Jang | 455/575.4 |
| 8,055,310 | B2 * | 11/2011 | Beart et al. | 455/572 |
| 8,090,423 | B2 * | 1/2012 | Na et al. | 455/575.5 |
| 8,095,180 | B2 * | 1/2012 | Lee et al. | 455/556.1 |
| 8,245,842 | B2 * | 8/2012 | Bau | 206/320 |
| 8,469,189 | B2 * | 6/2013 | Liang | 206/320 |
| 8,526,180 | B2 * | 9/2013 | Rayner | 361/679.55 |
| 8,537,528 | B2 * | 9/2013 | Lee et al. | 361/679.01 |
| 8,579,172 | B2 * | 11/2013 | Monaco et al. | 224/666 |
| 8,592,062 | B2 * | 11/2013 | Kim | 429/7 |
| 8,600,374 | B1 * | 12/2013 | Hertlein et al. | 455/425 |
| 8,616,422 | B2 * | 12/2013 | Adelman et al. | 224/191 |
| 8,646,698 | B2 * | 2/2014 | Chen et al. | 235/492 |
| 2005/0127189 | A1 * | 6/2005 | Hung et al. | 235/492 |
| 2007/0270194 | A1 * | 11/2007 | Park | 455/575.1 |
| 2008/0064455 | A1 * | 3/2008 | Joo et al. | 455/575.4 |

(Continued)

*Primary Examiner* — Hai V Nguyen
(74) *Attorney, Agent, or Firm* — Li & Cai Intellectual Property (USA) Office

(57) ABSTRACT

A extension case adaptable onto a mobile terminal device to enable extended functions, includes a sheath, an electrical connector, a battery, and a radio frequency identification (RFID) antenna. The sheath is configured to shieldingly receive the mobile terminal device and comprises a covering portion and a buckling portion curvedly extended from an outer edge of the covering portion. The electrical connector is arranged on the buckling portion of the sheath for establishing electrical connection with the mobile terminal device. The battery is disposed on the covering portion and is accessible to the mobile terminal device through the electrical connector. The RFID antenna is electrically connected to the electrical connector and embeddedly disposed in the covering portion adjacent to the battery in a non-overlapping manner.

10 Claims, 6 Drawing Sheets

(56) References Cited

U.S. PATENT DOCUMENTS

| | | | |
|---|---|---|---|
| 2008/0119245 A1* | 5/2008 | Jeong | 455/575.1 |
| 2008/0132289 A1* | 6/2008 | Wood et al. | 455/566 |
| 2008/0139259 A1* | 6/2008 | Jeong | 455/575.3 |
| 2009/0017778 A1* | 1/2009 | Akieda | 455/90.3 |
| 2009/0247236 A1* | 10/2009 | Kajiwara et al. | 455/566 |
| 2010/0004027 A1* | 1/2010 | Jang et al. | 455/566 |
| 2010/0078343 A1* | 4/2010 | Hoellwarth et al. | 206/320 |
| 2010/0081470 A1* | 4/2010 | Lee et al. | 455/556.1 |
| 2010/0085257 A1* | 4/2010 | Kalliola et al. | 342/443 |
| 2010/0093412 A1* | 4/2010 | Serra et al. | 455/575.8 |
| 2010/0112949 A1* | 5/2010 | Kim et al. | 455/41.3 |
| 2010/0210300 A1* | 8/2010 | Rizzo et al. | 455/552.1 |
| 2010/0216520 A1* | 8/2010 | Lee | 455/572 |
| 2010/0277377 A1* | 11/2010 | Sato et al. | 343/702 |
| 2010/0289708 A1* | 11/2010 | Bungo et al. | 343/702 |
| 2010/0302110 A1* | 12/2010 | Leem | 343/702 |
| 2011/0053653 A1* | 3/2011 | Tho et al. | 455/566 |
| 2011/0263292 A1* | 10/2011 | Phillips | 455/556.1 |
| 2012/0122520 A1* | 5/2012 | Phillips | 455/556.2 |
| 2012/0190406 A1* | 7/2012 | Chen | 455/557 |
| 2012/0243195 A1* | 9/2012 | Lim et al. | 361/784 |
| 2012/0292390 A1* | 11/2012 | Yu et al. | 235/380 |
| 2012/0306438 A1* | 12/2012 | Howard et al. | 320/107 |
| 2012/0325882 A1* | 12/2012 | Tages et al. | 224/676 |
| 2013/0017788 A1* | 1/2013 | Norair et al. | 455/41.2 |
| 2013/0206844 A1* | 8/2013 | CHEN et al. | 235/492 |
| 2013/0207472 A1* | 8/2013 | CHIANG, Kuo-Ching | 307/48 |
| 2013/0267284 A1* | 10/2013 | RYU et al. | 455/575.7 |

* cited by examiner

MOBILE TERMINAL EXTENSION CASE

BACKGROUND OF THE INVENTION

1. Field of the Invention

The instant disclosure relates to an extension case and a mobile terminal assembly using the same; more particularly, to an extension case for a mobile terminal device that incorporates an add-on battery and a radio frequency identification (RFID) antenna.

2. Description of Related Art

As wireless technology rapidly expands, a mobile terminal device (such as a cell phone) is no longer just used as a voice communication tool. Instead, the mobile terminal has been combined with other technologies to make it more diverse functions, such as Near Field Communication (NFC) technology, which developed from a radio frequency identification (RFID) technology of the wireless devices.

In 13.56 MHz frequency band, the NFC technology is able to apply the RFID technology for transmitting data in short distance at low power. When the use of the NFC technology by allowing two or more terminals to each other close, without requiring any user manipulation that is able to exchange information. Furthermore, the majority of the NFC technology is standardized by the European computer vendors alliance. Nokia, Sony, and Philips are involved in standardization and commercialization of the NFC technology.

Therefore, the NFC mobile terminal device used for payment has become an important application of the mobile terminal device. Traditional NFC antenna is set on the system circuit board of the mobile terminal device, if the NFC antenna is too close to the components of the system circuit board (or the rechargeable battery of the mobile terminal device), the system circuit board will have NFC antenna signal transceiver impact.

To address the above issues, the inventors strive via industrial experience and academic research to present the instant disclosure, which can effectively improve the limitations described above.

SUMMARY OF THE INVENTION

The instant disclosure provides an extension case and a mobile terminal assembly, which can be used for supplying power to the mobile terminal device and causing the mobile terminal device has RFID function.

Embodiments of the instant disclosure provide an extension case used for adapting on a mobile terminal device. The extension case comprises a sheath, an electrical connector, a battery, and a radio frequency identification (RFID) antenna. The sheath, shieldingly adaptable onto the mobile terminal device, has a covering portion and a buckling portion curvedly extended from an outer edge of the covering portion. The electrical connector is arranged on the buckling portion of the sheath for establishing electrical connection with the mobile terminal device. The battery is accessibly in the covering portion and electrically connectable with the mobile terminal device through the electrical connector. The RFID antenna is electrically connected to the electrical connector and embeddedly arranged in the covering portion adjacent to the battery in an non-overlapping manner.

Preferably, the electrical connector and the RFID antenna are respectively arranged on two opposite sides of the battery, and the RFID antenna and the battery are spaced apart.

Preferably, the back clip further comprises a circuit board having a filtering module, wherein the battery and the RFID antenna are electrically connected to the electrical connector via the filtering module of the circuit board.

Preferably, the back clip further comprises a power assembly set in the buckling portion and electrically connected to the circuit board, wherein the power assembly has a power switch for providing power supply management.

Preferably, the power assembly has an electric quantity display used for showing the electric quantity of the battery and a charging port used for charging the battery.

Preferably, the circuit board has a display module enabling the mobile terminal device to show information about the RFID antenna.

Preferably, a battery vessel and an antenna trough are separately formed on the sheath, the battery is disposed in the battery vessel, and the RFID antenna is disposed in the antenna trough.

Preferably, the back clip further comprises a lid engaged to the sheath, wherein the lid is covered and positioned the battery and the RFID antenna.

Preferably, the RFID antenna is formed on the covering portion of the sheath.

Embodiments of the instant disclosure also provide a mobile terminal assembly that comprises a mobile terminal device, a sheath, an electrical connector, a battery, and a near field communication (NFC) antenna. The mobile terminal device is having a power connecting port disposed on the edge of the mobile terminal device. The sheath, shieldingly adaptable onto the mobile terminal device, has a covering portion and a buckling portion curvedly extended from an outer edge of the covering portion. The electrical connector is arranged on the buckling portion of the sheath for establishing electrical connection with the mobile terminal device. The battery is accessibly in the covering portion and electrically connectable with mobile terminal device through the electrical connector. The NFC antenna is electrically connected to the electrical connector and embeddedly disposed in the covering portion adjacent to the battery in a non-overlapping manner.

Based on the above, the extension case and the mobile terminal assembly, which can be used for supplying power to the mobile terminal device by the battery.

Moreover, the mobile terminal device has the electronic wallet, the money card, or other related functions by the RFID antenna of the extension case.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

First Embodiment

Figure 1:
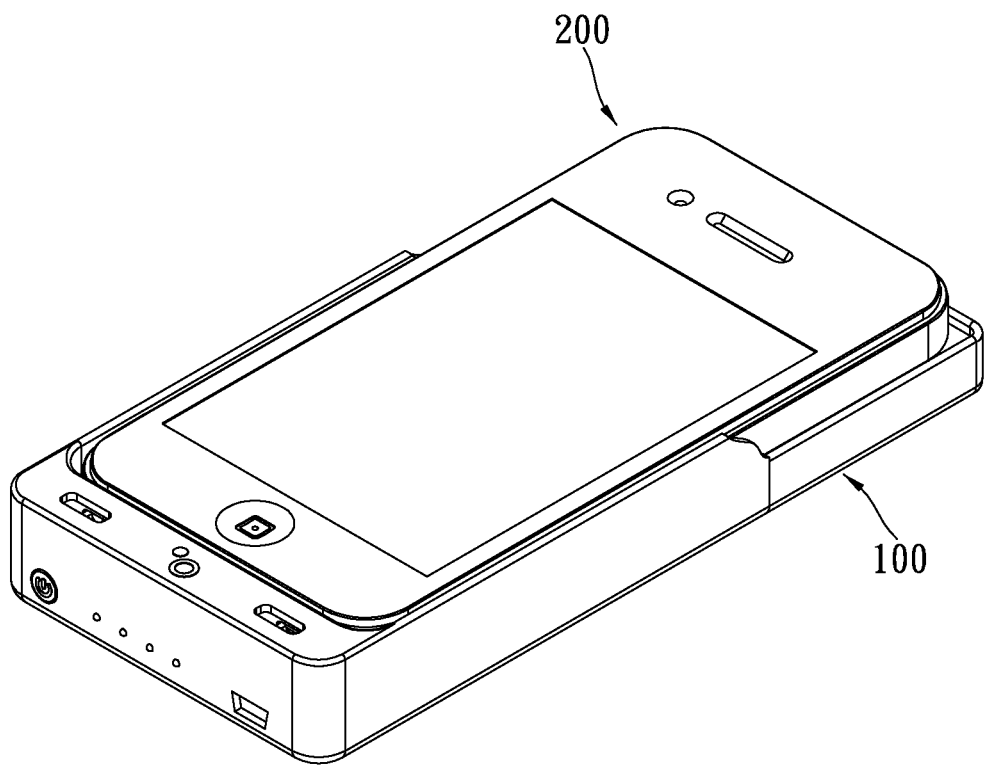
FIG. 1 shows a schematic view of the mobile terminal assembly for a first embodiment of the instant disclosure.
Figure 2:
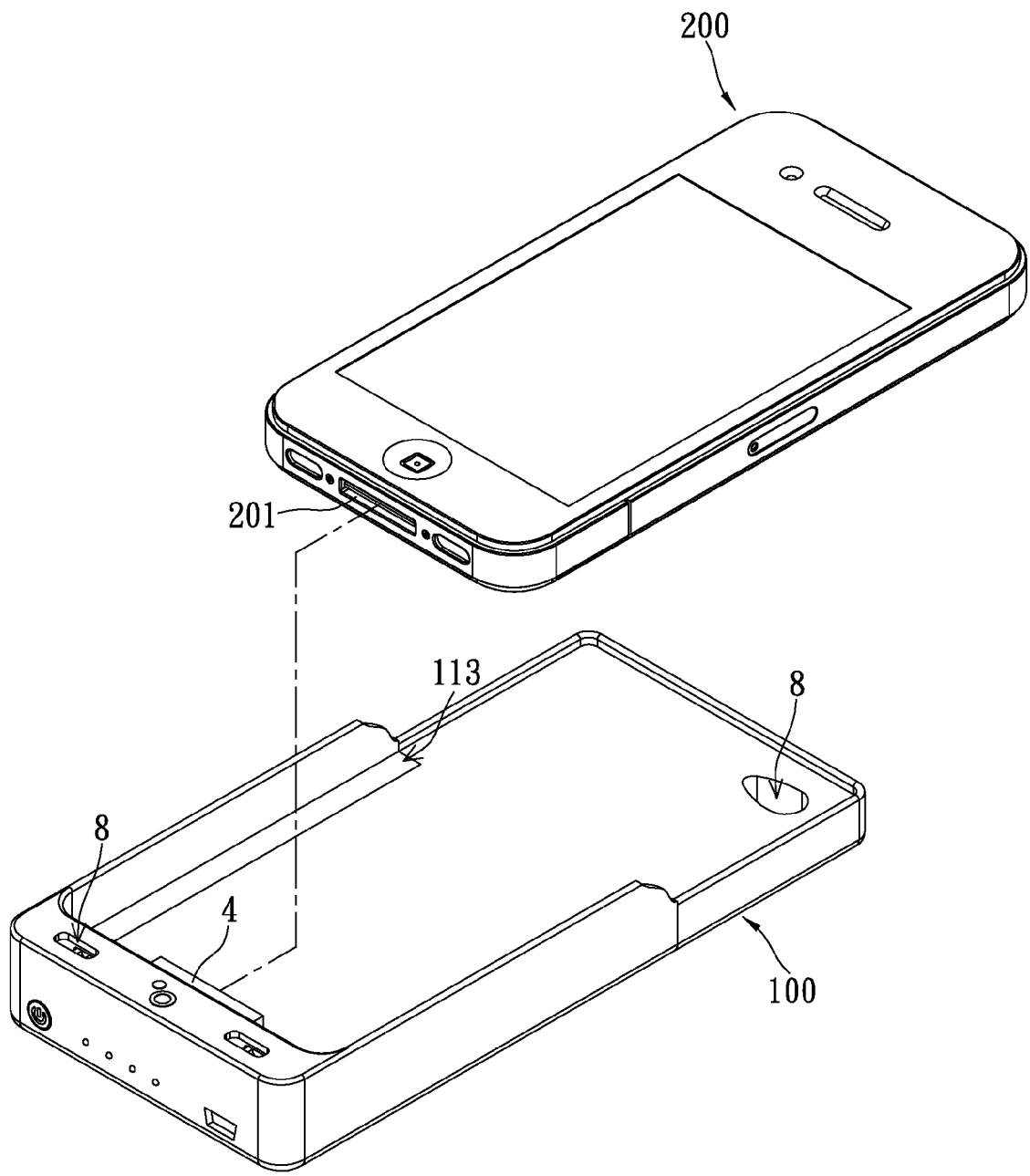
FIG. 2 shows an exploded schematic view of the mobile terminal assembly for a first embodiment of the instant disclosure.
Figure 3:
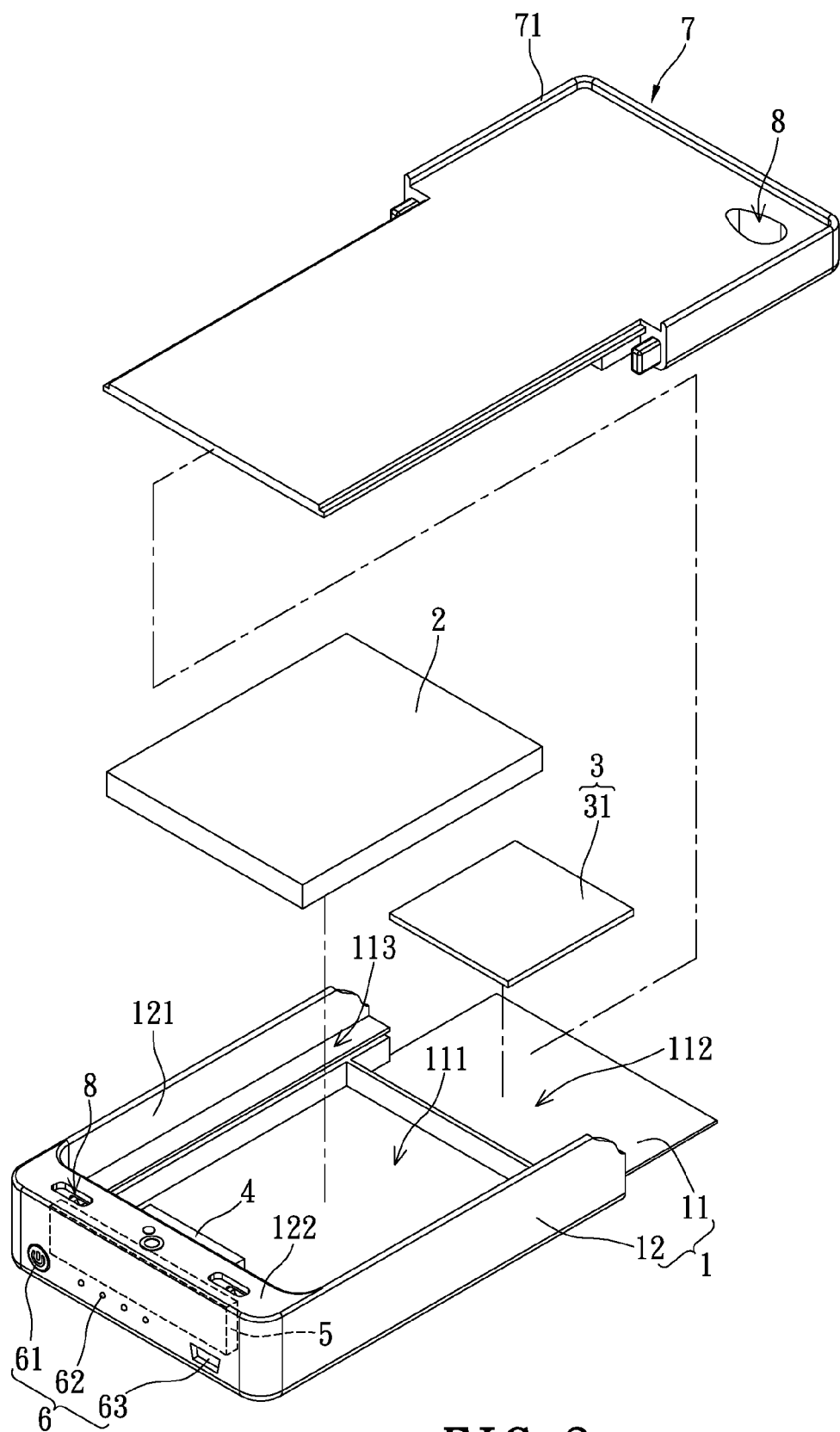
FIG. 3 shows an exploded schematic view of the extension case for a first embodiment of the instant disclosure.
Figure 4:
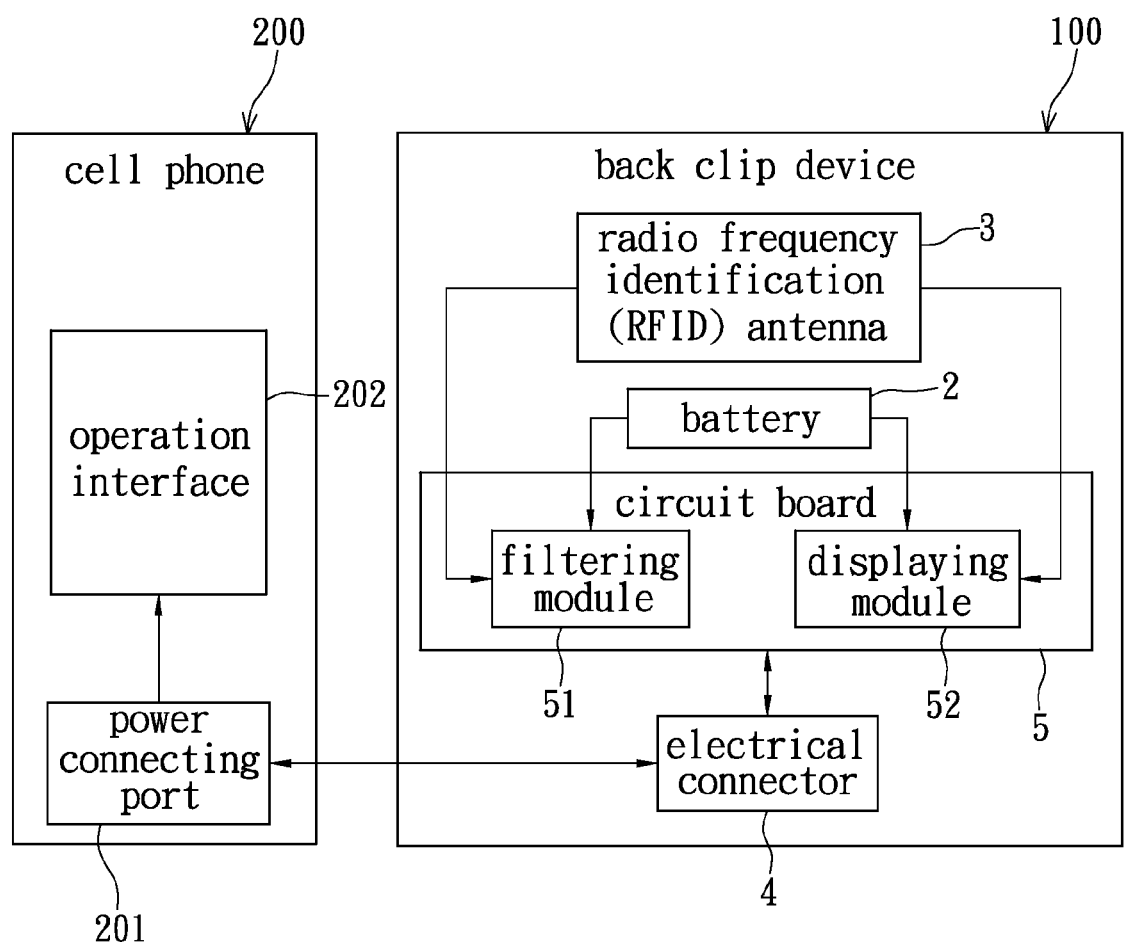
FIG. 4 shows a functional block view of the mobile terminal assembly for a first embodiment of the instant disclosure.

For a first embodiment of the instant disclosure, please refer to FIGS. 1-4. FIGS. 1-3 are a schematic view of the instant embodiment. FIG. 4 is a functional block view of the instant embodiment.

As shown in FIGS. 1 and 2, a mobile terminal assembly has a mobile terminal device 200 and an extension case 100. The mobile terminal device 200 has a power connecting port 201 disposed on the edge of the mobile terminal device 200. The extension case 100 is used for assembling on the edge of the mobile terminal device 200 and electrically connecting to the mobile terminal device 200 via the power connecting port 201.

The extension case 100 has a sheath 1, a battery 2, a radio frequency identification (RFID) antenna 3, an electrical connector 4, a circuit board 5, a power assembly 6, and a lid 7.

As shown in FIGS. 3 and 4, the sheath 1 is shieldingly adaptable onto the mobile terminal device 200, and has a covering portion 11 and a buckling portion 12 curvedly extended from an outer edge of the covering portion 11. The covering portion 11 is approximately rectangular plate shaped. A battery vessel 111 and an antenna trough 112 are separately spaced formed on an inner surface of the covering portion 11. The battery vessel 111 and the antenna trough 112 are approximately arranged in one low along the major axis of the covering portion 11.

An installed space 113 formed by the buckling portion 12 is communication with the battery vessel 111 and the antenna trough 112. The buckling portion 12 has two lateral walls 121 and an end wall 122. The two lateral walls 121 are separately arranged at two opposite side of the covering portion 11. The end wall 122 is arranged at one side of the battery vessel 111 away from the antenna trough 112.

The height of the buckling portion 12 is approximately equal to the thickness of the mobile terminal device 200, but in use, it not limited thereto.

The battery 2 is disposed in the battery vessel 111 of the covering portion 11. The battery 2 can be a rechargeable battery (such as lithium battery) for using repeatedly or an abandoned battery (such as Carbon-zinc battery or alkaline battery) for replaying easily as power of the abandoned battery exhausted.

Figure 2A:
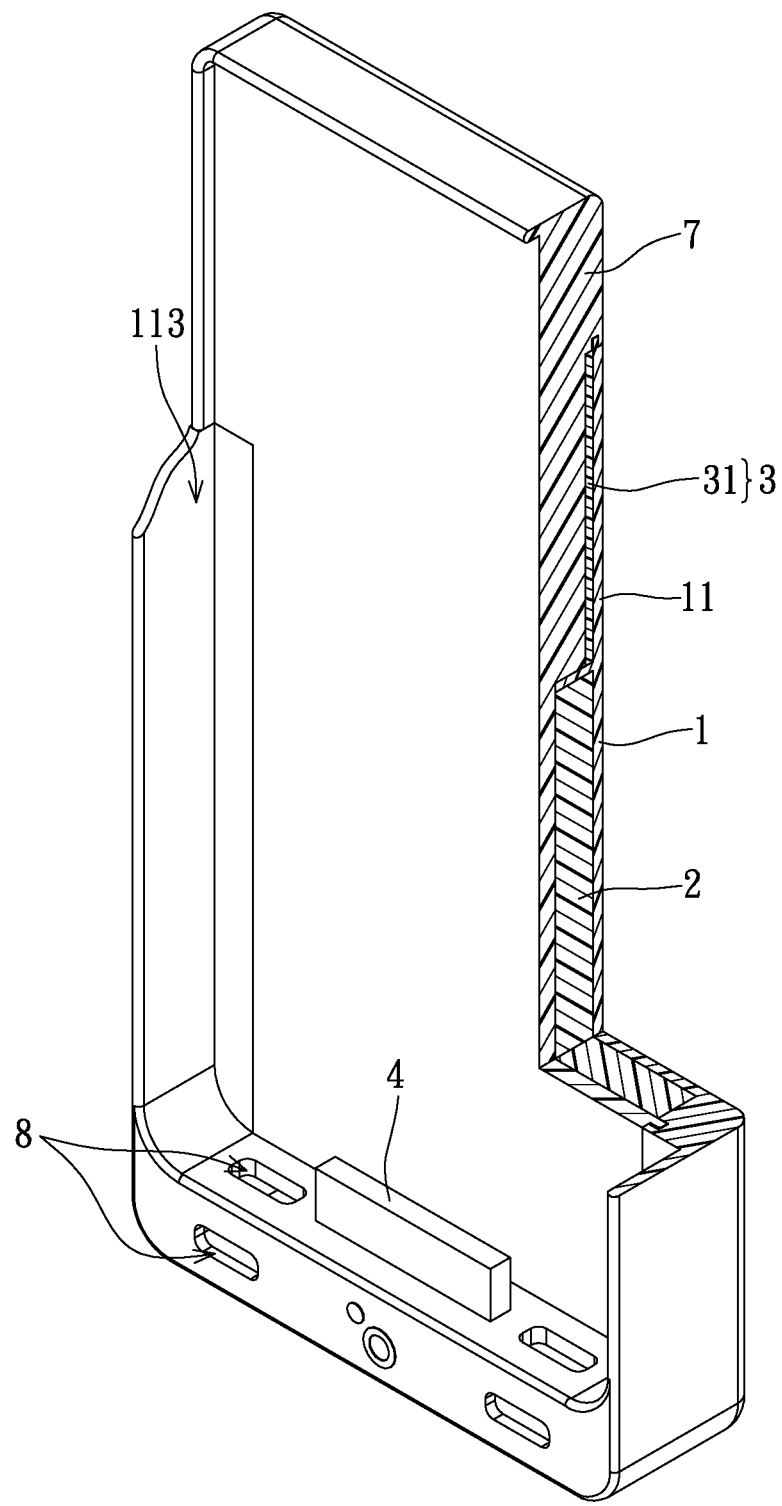
FIG. 2A shows a profile schematic view of the extension case for a first embodiment of the instant disclosure.

The RFID antenna 3 is disposed in the antenna trough 112 of the covering portion 11. The RFID antenna 3 is embeddedly arranged in the covering portion 11 adjacent to the battery 2 in a non-overlapping manner. More detail, the RFID antenna 3 is arranged outside a region defined by the battery 2 orthogonal projecting to an outer surface 11 of the covering portion 11 (as FIG. 2A shown).

Moreover, on this embodiment, the RFID antenna 3 can be a near field communication (NFC) antenna 31, but not limited thereto.

The electrical connector 4 is set on the buckling portion 12 of the sheath 1. More detail, the electrical connector 4 is set on an inner surface of the end wall 122 adjacent to the battery vessel 111. That is, the electrical connector 4 and the RFID antenna 3 are respectively arranged on two opposite sides of the battery 2, and the RFID antenna 3 and the battery 2 are spaced apart.

The circuit board 5 is set inside the end wall 122 of the buckling portion 12, and the circuit board 5 has a filtering module 51 and a display module 52. The battery 2 and the RFID antenna 3 are electrically connected to the electrical connector 4 via the filtering module 51 of the circuit board 5, thereby filtering the unnecessary signals to reduce the interference between the battery 2 and the RFID antenna 3.

In this embodiment, the filtering module 51 and the display module 52 can be a hardware nodule or a software module, but not limited thereto. In addition, in use, the designer can set the display module 52 on a system circuit board (not shown) of the mobile terminal device 200.

The power assembly 6 is set in the buckling portion 12 and electrically connected to the circuit board 5. More detail, the power assembly 6 is exposed from an outer surface of the end wall 122 of the buckling portion 12 away from the battery vessel 111. The power assembly 6 has a power switch 61, an electric quantity display 62, and a charging port 63.

The power switch 61 is a self-return type push button set on the outer surface of the end wall 122 of the buckling portion 12. The power switch 61 is electrically connected to the circuit board 5 for providing power supply management so as to control the extension case 100 operated or not. For example: the user can press the power switch 61 to control the battery to supply energy or not.

Additionally, the electric quantity display 62 and the charging port 63 are electrically connected to the circuit board 5 and set on the outer surface of the end wall 122 of the buckling portion 12. Thus, the user can easily know the electric quantity of the battery by the electric quantity display 62, and the user can conveniently charge the battery 2 of the extension case 100 via the charging port 63 without tacking out the battery 2.

In this embodiment, the electric quantity display 62 takes a plurality of LEDs for example, and the electric quantity of the battery shows by the number of the lighting LEDs. But in use, the electric quantity display 62 can be a display panel (not shown).

The lid 7 is plate shaped and engaged to one end portion of the sheath 1 away from the end wall 122. When the lid 7 and the sheath 1 are combined (as FIG. 2 shown), the lid 7 is covered the battery vessel 111 and the antenna trough 112, so that the battery 2 and the RFID antenna 3 can be covered and positioned by the lid 7. In addition, when the lid 7 and the sheath 1 are combined, the installed space 113 is redefined by the lid 7 to approach the shape of the mobile terminal device 200.

The lid 7 has a resisting ring 71 arranged at the outer edge of the lid 7 to prevent the mobile terminal device 200 from falling down. Besides, in this embodiment, the combination manner of the lid 7 and the sheath 1 is taken the lid 7 and the sheath 1 engaged to each other for example, but not limited thereto.

Above all, when the extension case 10 is installed on the mobile terminal device 200 to form the mobile terminal assembly, the mobile terminal device 200 is received in the installed space 113 and the outer edge of the mobile terminal device 200 is resisted and limited to the buckling portion 12 of the sheath 1 and the resisting ring 71 of the lid 7. The electrical connector 4 of the extension case 100 is inserted into the power connecting port 201 of the mobile terminal device 200 to achieve electrical connection and fixed position with each other.

Moreover, the extension case 100 has a plurality of perforations 8 to correspond the other ports, the horn, the buttons, the camera, and the other relative components of the mobile terminal device 200.

One end of the electrical connector 4 is docking and electrically connected to the power connecting port 201, and the other end of the electrical connector 4 is electrically connected to the battery 2 and the RFID antenna 3 via the circuit board 5, whereby the battery 2 of the extension case 100 can be used for providing energy to the mobile terminal device 200.

The interference between the battery 2 and the RFID antenna 3 can be reduced via the filtering module 51. When using the mobile terminal device 200, the operation interface 202 of the mobile terminal device 200 will show information about the battery 2 and the RFID antenna 3 by the display module 52.

Thus, the extension case 100 can be used for supplying power to the mobile terminal device 200 by the battery 2. Moreover, the mobile terminal device 200 has the electronic wallet, the money card, or other related functions by the RFID antenna of the extension case 100.

Besides, an antimagnetic component (not shown) can be set between the rechargeable battery (not shown) of the mobile terminal device 200 and the RFID antenna 3 and the battery 2, so that the interference generated from the RFID antenna 3 can be reduced.

Second Embodiment

Figure 5:
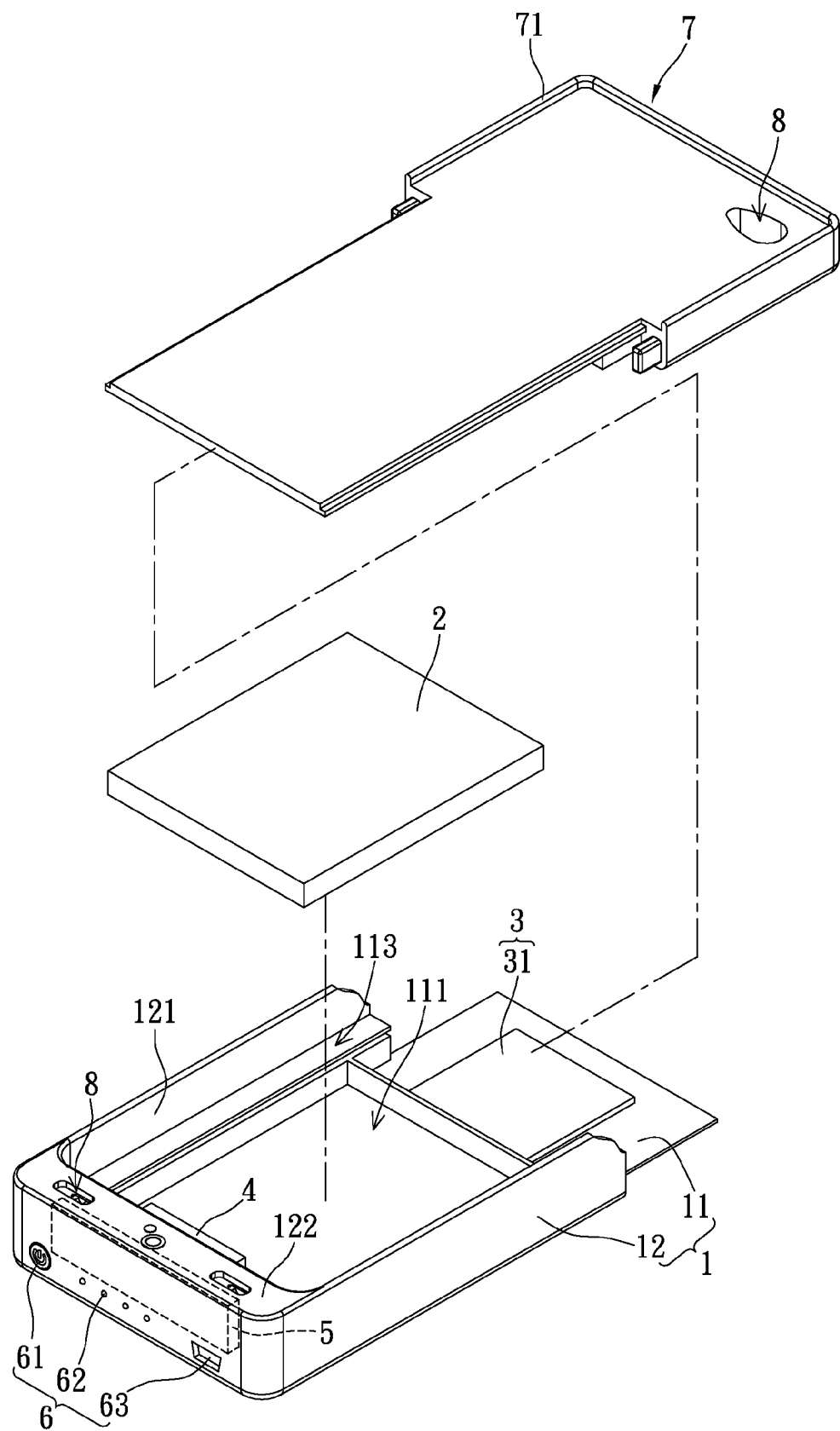
FIG. 5 shows an exploded schematic view of the extension case for a second embodiment of the instant disclosure.

For a second embodiment of the instant disclosure, please refer to FIG. 5. The second embodiment is similar to the first embodiment, and the difference between both is the RFID antenna 3.

In other words, the RFID antenna 3 of this embodiment can be directly formed on the covering portion 11 of the sheath 1 (such as the bottom of the antenna trough 112), and the forming method of the RFID antenna 3 is not limited, for example, the RFID antenna 3 can be formed on the covering portion 11 by Laser Direct Structure (LDS) method. Besides, the RFID antenna 3 can be directly formed on the lid 7 (not shown).

Capabilities of the Embodiments

Based on the above embodiments, the extension case 100 can be used for supplying power to the mobile terminal device 200 by the battery 2, so as to increase the using time of the mobile terminal device 200. Moreover, the mobile terminal device 200 has the electronic wallet, the money card, or other related functions by the RFID antenna of the extension case 100.

Additionally, the extension case 100 can reduce the interference generated from the RFID antenna 3 by using the filtering module 51 and disposing the battery 2 and the RFID antenna 3, such as the RFID antenna 3 is arranged outside the region defined by the battery 2 orthogonal projecting to the outer surface of the covering portion 11.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. An extension case for adapting on a mobile terminal device, the extension case comprising:
    a sheath shieldingly adaptable onto the mobile terminal device having a covering portion and a buckling portion curvedly extended from an outer edge of the covering portion;
    an electrical connector arranged on the buckling portion of the sheath for establishing electrical connection with the mobile terminal device;
    a battery accessibly in the covering portion and electrically connectable with the mobile terminal device through the electrical connector; and
    a radio frequency identification (RFID) antenna electrically connected to the electrical connector and embeddedly arranged in the covering portion adjacent to the battery in a non-overlapping manner.

2. The extension case as claimed in claim 1, wherein the electrical connector and the RFID antenna are respectively arranged on two opposite sides of the battery, and the RFID antenna and the battery are spaced apart.

3. The extension case as claimed in claim 1, further comprising a circuit board having a filtering module, wherein the battery and the RFID antenna are electrically connected to the electrical connector via the filtering module of the circuit board.

4. The extension case as claimed in claim 3, further comprising a power assembly set in the buckling portion and electrically connected to the circuit board, wherein the power assembly has a power switch for providing power supply management.

5. The extension case as claimed in claim 4, wherein the power assembly has an electric quantity display used for showing the electric quantity of the battery and a charging port used for charging the battery.

6. The extension case as claimed in claim 4, wherein the circuit board has a display module enabling the mobile terminal device to show information about the RFID antenna.

7. The extension case as claimed in claim 1, wherein a battery vessel and an antenna trough are separately formed on the sheath, the battery is disposed in the battery vessel, and the RFID antenna is disposed in the antenna trough.

8. The extension case as claimed in claim 7, further comprising a lid engaged to the sheath, wherein the lid is covered and positioned the battery and the RFID antenna.

9. The extension case as claimed in claim 1, wherein the RFID antenna is formed on the covering portion of the sheath.

10. A mobile terminal assembly, comprising:
    a mobile terminal device, having a power connecting port disposed on the edge thereof;
    a sheath shieldingly adaptable onto the mobile terminal device having a covering portion and a buckling portion curvedly extended from an outer edge of the covering portion;
    an electrical connector arranged on the buckling portion of the sheath for establishing electrical connection with the mobile terminal device;
    a battery accessibly in the covering portion and electrically connectable with mobile terminal device through the electrical connector; and
    a near field communication (NFC) antenna electrically connected to the electrical connector and embeddedly disposed in the covering portion adjacent to the battery in a non-overlapping manner.

* * * * *